United States Patent
Pfander et al.

(10) Patent No.: US 7,543,276 B2
(45) Date of Patent: Jun. 2, 2009

(54) SYSTEM AND METHOD FOR TESTING AND/OR DEBUGGING RUNTIME SYSTEMS FOR SOLVING MES (MANUFACTURING EXECUTION SYSTEM) PROBLEMS

(75) Inventors: Gotthard Pfander, Erlangen (DE); Elmar Thurnet, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 771 days.

(21) Appl. No.: 10/497,773

(22) PCT Filed: Nov. 28, 2002

(86) PCT No.: PCT/DE02/04377

§ 371 (c)(1),
(2), (4) Date: Jun. 3, 2004

(87) PCT Pub. No.: WO03/050727

PCT Pub. Date: Jun. 19, 2003

(65) Prior Publication Data

US 2005/0044532 A1 Feb. 24, 2005

(30) Foreign Application Priority Data

Dec. 12, 2001 (DE) ............................. 101 61 065

(51) Int. Cl.
*G06F 9/44* (2006.01)
*G05B 19/42* (2006.01)

(52) U.S. Cl. .................. 717/125; 717/113; 717/109; 717/105; 700/87

(58) Field of Classification Search ......... 717/120–125, 717/105, 109, 113, 126

See application file for complete search history.

(56) References Cited

U.S. PATENT DOCUMENTS

| 5,631,825 | A |  | 5/1997 | van Weele et al. |
| 5,862,381 | A |  | 1/1999 | Advani et al. |
| 5,911,041 | A | * | 6/1999 | Schaffer ................. 714/38 |
| 5,926,176 | A | * | 7/1999 | McMillan et al. ......... 715/764 |
| 6,216,143 | B1 | * | 4/2001 | Ryan et al. ............... 715/526 |
| 6,243,857 | B1 | * | 6/2001 | Logan et al. ............. 717/111 |
| 6,505,342 | B1 | * | 1/2003 | Hartmann et al. ......... 717/104 |
| 6,973,638 | B1 | * | 12/2005 | Gangopadhyay et al. ... 717/104 |
| 2002/0144256 | A1 | * | 10/2002 | Budhiraja et al. ........ 717/174 |

(Continued)

FOREIGN PATENT DOCUMENTS

EP 0 910 000 A1 4/1999

(Continued)

OTHER PUBLICATIONS

Dirk Kozian, "Transparenz über die Abläufe schaffen", Elektronik für die Automatisierung 11, Nov. 17, 1999, pp. 66, 68 and 69, Germany.

(Continued)

*Primary Examiner*—Insun Kang (57) ABSTRACT

The invention relates to a system and method for testing and/or debugging runtime systems, particularly runtime systems used for solving MES (manufacturing execution system) problems. According to the invention, a user uses an editor to link graphic elements to an activity diagram that can be visually depicted on a display device. Communication relationships can be established between the activity diagrams by using appropriate means. In addition, the operation of an asynchronously cooperating state machine is described by an activity diagram.

15 Claims, 5 Drawing Sheets

U.S. PATENT DOCUMENTS

2003/0172371 A1* 9/2003 Offenmuller .............. 717/120
2004/0177055 A1* 9/2004 Heidemann et al. ........... 707/1

FOREIGN PATENT DOCUMENTS

EP    1 134 636 A1    9/2001

OTHER PUBLICATIONS

Noritaka Osawa, Kei Hisano, and Toshitsugu Yuba, "A Visual Performance Debugging System for Parallel Programs", Proceedings of the 29th Annual Hawaii International Conference on System Sciences—1996, IEEE 1996, pp. 300-309, Hawaii, USA.

Dirk Schaun, "Fliegenfänger", mc Apr. 1993, pp. 96, 98, 99 and 101.

Peter Zwinge, "Objektorientiertes Programmieren und Visualisieren von Automatisiemgssystemen", ATP Automatisierungstechnische Praxis & Messen Steuern Regeln 34, Sep. 1991, No. 9, pp. 485-490, Muenchen, Germany.

B. Howein, Dr. B. Gaiβmaier, "Rechnerunterstützte Methoden und Werkzeuge in der industriellen Automatsierung", Informationstechnik it 33, Mar. 1991, pp. 131-142, R. Oldenbourg Verlag, Germany.

Takao Shimomura and Sadahiro Isoda, "VIPS: A Visual Debugger for List Structures", Computer Software and Applications Conference, 1990. COMPSAC 90. Proceedings, Fourteenth Annual International, Chicago, IL, USA, Oct. 31-Nov. 2, 1990, Los Alamitos, CA, USA, IEEE Comput. Soc., US, pp. 530-537, XP010019766.

Sadahiro Isoda, Takao Shimomura and Yuji Ono, "VIPS: A Visual Debugger", IEEE Software, May 1987, pp. 8-18.

Robin Milner, "Communicating and Mobile Systems: the π calculus", Cambridge University Press, 1999.

* cited by examiner

FIG 6

SYSTEM AND METHOD FOR TESTING AND/OR DEBUGGING RUNTIME SYSTEMS FOR SOLVING MES (MANUFACTURING EXECUTION SYSTEM) PROBLEMS

CROSS REFERENCE TO RELATED APPLICATIONS

This application is the US National Stage of International Application No. PCT/DE02/04377, filed Nov. 28, 2002 and claims the benefit thereof. The International Application claims the benefits of German application No. 10161065.3 filed Dec. 12, 2001, both of the applications are incorporated by reference herein in their entirety.

FIELD OF INVENTION

The invention relates to a system for testing and/or debugging runtime systems, particularly runtime systems used for solving MES problems, whereby a user uses an editor to link graphic elements to an activity diagram that can be visually depicted on a display device, whereby communication relationships can be established between the activity diagrams by using appropriate means and whereby the operation of an asynchronously cooperating state machine is described by an activity diagram.

The invention also relates to an associated method, a computer program, a data medium and a data processing device.

BACKGROUND OF INVENTION

From "Software für die Automatisierung—Transparenz über die Abläufe schaffen" (Software for automation—Creating process transparency), an article by Dirk Kozian in Elektronik für Automatisierung (Automation Electronics) 11, 17.11.1999, it is known that what are known as Manufacturing Execution Systems (MES) can be used to automate production and manufacturing processes. These systems integrate the automation level or controls with the corporate-level ERP systems (ERP: Enterprise Resource Planning). Manufacturing Execution Systems are systems, which for example supply information for optimizing production processes. On the one hand the Manufacturing Execution Systems have to extend the general planning data of the ERP systems to include unit-specific and up-to-date detailed planning data and forward this correspondingly to the lower-level automation level and on the other hand they have the task of extracting production-relevant information from the automation level, processing this and forwarding it to the corporate level. MES systems thereby perform the role of vertical integration between corporate level and automation level. Typical individual tasks of MES systems are Enterprise Asset Management, Maintenance Management, Information Management, Scheduling, Dispatching and Trace & Track. These tasks are executed by MES components and MES applications respectively.

From "Communicating and Mobile Systems: the Π calculus", Robin Milner, Cambridge University Press, 1999, it is known that asynchronously cooperating state machines can be used to model communication systems.

In "Rechnerunterstützte Methoden und Werkzeuge in der industriellen Automatisierung" (Computer-aided methods and tools in industrial automation), B. Howein and Dr. B. Gaißmaier, in it 3/91, it is proposed that the formal design technique SDL (Specification and Description Language) be used for the design of software systems for industrial automation and that tests be carried out at design level. The procedure described there however relates to software solutions for automation level (controls) and is therefore not ideal.

SUMMARY OF INVENTION

The object of the invention is therefore to create a system and a method for testing and/or debugging runtime systems, particularly runtime systems for MES or ERP (Enterprise Resource Planning) solutions, which are appropriate for the mode of operation of said solutions.

According to the invention the above-mentioned object for a method is achieved by means of the features of claim 1. Particularly in the MES environment applications or subcomponents generally operate in a stand-alone and (for their own part) synchronously adjacent manner but communicate with each other asynchronously. The inventors have therefore worked on the basis of the knowledge that MES applications and solutions for MES systems can be very elegantly represented or achieved by means of asynchronously cooperating state machines. The testing and debugging of such MES systems (and also ERP systems) should in the view of the inventors be effected directly on said asynchronously cooperating state machines, as the actual response of the implemented system can be verified in a very realistic manner by this means.

MES systems or ERP systems generally comprise what is known as a runtime system for temporal control of the operation of the components (subcomponents, modules, tasks, operating system processes, etc.) involved and what is known as an engineering system for creating and editing programs, which are intended for execution in the runtime system.

Users then have the option of verifying the response or error of a program run at graphic level.

In the present invention users can implement debugging in single-step mode or in full-run mode (fast run through the single steps). A single step can be allocated methods and associated parameter assignments by means of variable values, conditions or references to other objects. This can be effected by means of input masks. Users can trace the path through the program visually on screen in both modes. The current graphic element can for example be indicated by a cursor or color change. Other visualization options are also possible.

In a first advantageous embodiment of the invention for a method, the sub-processes comprise single steps, which refer to executable codes. The methods of these single steps can indicate different types of executable code, such as Visual Basic Scripts, COM function calls, executable programs, etc. An explicit compiler step is thereby saved during testing or debugging.

In a further advantageous embodiment of the invention for a method, control of the runtime system is effected in elements of the activity diagram. More specifically the runtime system comprises the methods start, stop, abort, single-step, skip-step, rewind-step for example for this control. A runtime system (state machine) [can] thereby influence another runtime system or itself.

In a further advantageous embodiment of the invention for a method, the variables for the single steps are pre-allocated statically or dynamically. A single step can be allocated methods and associated parameter assignments by means of variable values, conditions or references to other objects. The variables are pre-allocated via input masks with parameter assignment for in, out or in/out parameters or constants or literals.

In a further advantageous embodiment of the invention for a method, complete or partial solutions are loaded and launched with their connections. This makes the automatic testing of programs (e.g. automatic regression tests) very simple.

In a further advantageous embodiment of the invention for a method, during operation of the asynchronously cooperating state machine the current graphic element in the activity diagram in each instance is identified optically on a display device. Users can therefore trace the program run in the activity diagram and thereby identify a positive or even a negative response on the part of the program by visual means.

In a further advantageous embodiment of the invention for a method, error statuses are highlighted visually. In this way users are notified directly of errors.

According to the invention the above-mentioned object for a system is achieved by means of the features of claim 8. MES systems or ERP systems generally comprise what is known as a runtime system for temporal control of the operation of the components (subcomponents, modules, tasks, operating system processes, etc.) involved, as well as what is known as an engineering system for creating and editing programs, which are intended for execution in the runtime system.

Users therefore have the option of verifying the response or error of a program run at graphic level.

In the present invention users can implement debugging in single-step mode or in full-run mode (fast run through the single steps). A single step can be allocated methods and associated parameter assignments by means of variable values, conditions or references to other objects. This can be effected by means of input masks. Users can trace the path through the program visually on screen in both modes. The current graphic element can for example be indicated by a cursor or color change. Other visualization options are also possible.

Typical input means are the mouse, keyboard, light pen, etc. Typical display means are the screen (monitor, display), whereby a screen can comprise a plurality of screen areas. A drag & drop mechanism is advantageous here.

In a first advantageous embodiment of the invention for a system the sub-processes comprise single steps, which refer to executable codes. The methods of these single steps can indicate different types of executable code, such as Visual Basic Scripts, COM function calls, executable programs, etc. An explicit compiler step is thereby saved during testing or debugging.

In a further advantageous embodiment of the invention for a system, control of the runtime system is effected in elements of the activity diagram. More specifically the runtime system comprises the methods start, stop, abort, single-step, skip-step, rewind-step for example for this control. A runtime system (state machine) [can] thereby influence another runtime system or itself.

In a further advantageous embodiment of the invention for a system, the variables for the single steps are pre-allocated statically or dynamically. A single step can be allocated methods and associated parameter assignments by means of variable values, conditions or references to other objects. The variables are pre-allocated via input masks with parameter assignment for in, out or in/out parameters or constants or literals.

In a further advantageous embodiment of the invention for a system, complete or partial solutions can be loaded and launched with their connections. This makes the automatic testing of programs (e.g. automatic regression tests) very simple.

In a further advantageous embodiment of the invention for a system, during operation of the asynchronously cooperating state machine the current graphic element in the activity diagram in each instance can be identified optically on a display device. Users can therefore trace the program run in the activity diagram and thereby identify a positive or even a negative response on the part of the program by visual means.

In a further advantageous embodiment of the invention for a system, error statuses can be highlighted visually. In this way users are notified directly of errors.

In a further advantageous embodiment of the present invention the inventive method is implemented by means of a computer program. This means that any modifications or amendments can be carried out easily.

In a further advantageous embodiment of the present invention the computer program for the inventive method is stored on a data medium. This means that the method is easy to manage in respect of logistics and distribution.

In a further advantageous embodiment of the present invention the computer program for the inventive method is installed on a data processing device. This enhances performance.

BRIEF DESCRIPTION OF THE DRAWINGS

Further advantages and details of the invention will emerge from the description which follows of advantageous embodiments and in conjunction with the figures. Where elements with the same functionalities are described in different figures, said elements are identified with the same reference characters.

DETAILED DESCRIPTION OF INVENTION

Figure 1:
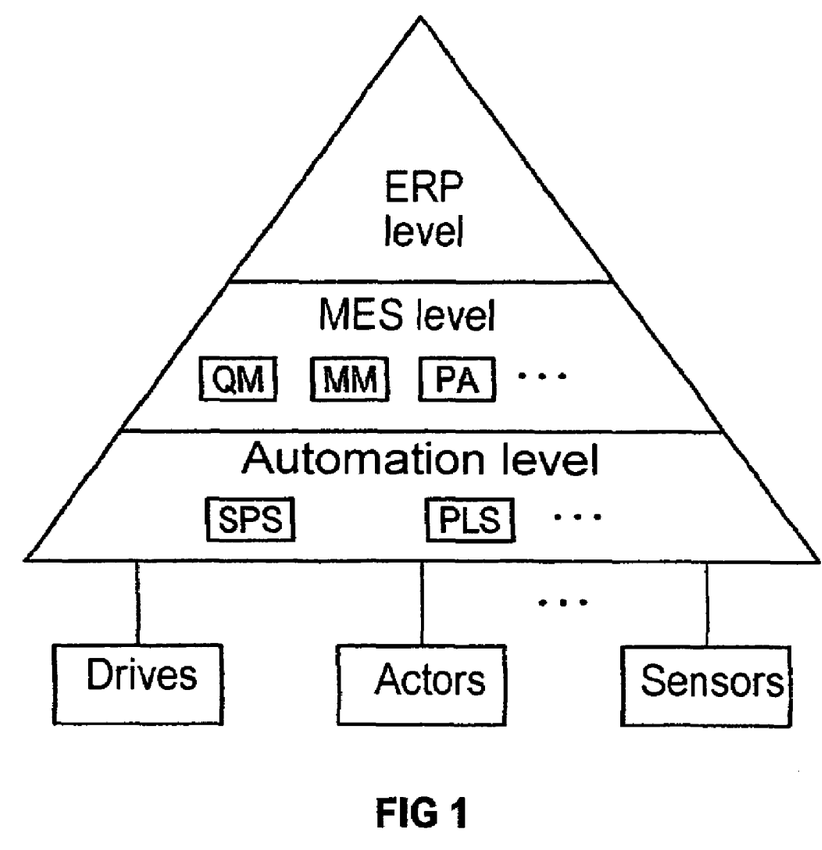
FIG. 1 shows an overview of the "corporate pyramid" with three control levels.

The representation according to FIG. 1 shows an overview of the three control levels, as generally found in a production or manufacturing company. The pyramid form shows that information is compressed upwards. The top level is the ERP (Enterprise Resource Planning) level. The business administration and sales tasks are generally carried out at this corporate level in a company (e.g. finance, sales, human resources, reporting). However logistics tasks relating to all the production units (e.g. order and materials management) are also carried out at this level. The SAP R/3 system is an ERP system that is very frequently used at corporate level.

The lowest level of the pyramid is automation level (controls). Stored program controls (SPS) are generally deployed at this level in conjunction with visualization and process control systems (PLS). The drive units, actuators and sensors of the production and/or manufacturing devices are directly connected to the systems of this level.

The connecting element between ERP level and automation level is formed by MES level. MES level applications thereby ensure vertical integration between ERP level and automation level. On the one hand MES applications have to extend the general planning of the ERP systems to include detailed planning that is production unit specific and forward this to the automation level systems and on the other hand the task of the MES applications is to extract production-relevant data from the automation level, process this and forward it to ERP level (corporate level).

Typical MES applications are for example Quality Management (QM), Maintenance Management (MM), Performance Analysis (PA), Process Management, Labor Management, Asset Management. The three dots in each instance in FIG. 1 show that there may be further elements (applications, systems, etc.) at a level.

MES systems or ERP systems generally contain what is known as a runtime system for temporal process control of the components involved (subcomponents, modules, tasks, operating system processes, etc.) and what is known as an engineering system to produce and edit programs, which are provided for execution in the runtime system.

Figure 2:
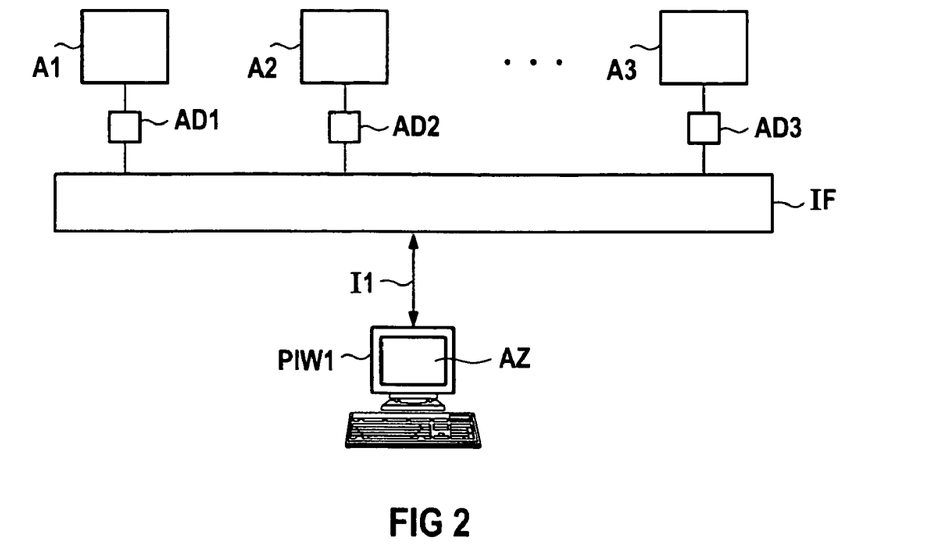
FIG. 2 shows an exemplary overview with software and hardware units for MES solutions.

The representation according to FIG. 2 shows an exemplary overview with software and hardware units for MES solutions. The individual MES applications A1 to A3 are connected via adapters AD1 to AD3 to a framework program IF. A user workplace PIW1 is linked via a bi-directional information path I1 to the framework program IF and can thereby manage and monitor the appended or integrated MES applications. The user workplace PIW1 generally comprises a display device (monitor, display, etc.), a data processing unit (e.g. PC) with processor and storage devices and input units (keyboard, mouse, etc.). The MES applications A1 to A3 and the framework program IF can run on their own specific data processing units or processors but it is also possible for them to run on the data processing unit of the PIW1.

The respective MES applications A1 to A3 are connected to the framework program IF via adapters AD1 to AD3. The connection between the adapters AD1-AD3 and the framework program IF is effected via appropriate data formats (e.g. XML), appropriate protocols (XOP, OPC, etc.) and appropriate transport mechanisms (e.g. DCOM or MSMQ). HTTP (Hyper Text Transfer Protocol) can also be used here. Also the protocol SOAP (Simple Object Access Protocol) based on XML (extensible Markup Language) can be used for integration of the adapters AD1-AD3 into the framework program IF.

The adapters are therefore the link modules between the framework program IF and the applications. Applications that are heterogeneous per se can be connected together via the adapters and integration with the framework program IF means that it is possible to communicate between the applications and to operate an exchange of data. The adapters are software modules, which provide connections to different applications. In typical integration scenarios this means integration into systems from the MES, ERP, SCADA or controls worlds. An adapter offers the functionality to start, control, etc. a component to be linked. An adapter allows access to data and functions of the application to be linked, provides specific runtime data and allows the loading of engineering information from the application to be linked. Adapters can differ in respect of structure and scope. Adapters can therefore be programmed in a fixed manner or they can be configured or modeled. They can also differ with regard to the possibilities for accessing the application to be linked. Adapters may therefore only permit access for data-related purposes but it is also possible for adapters to allow access to higher-order business processes. During start-up the adapters are loaded with the stored models and status information. In runtime it is verified whether and how the different integrated applications match up. A visualization or monitoring component can be used to request the status of an adapter and display it (even graphically) at the user workplace PIW1. Adapters allow the system and the user to have a standardized and uniform view of applications (depending on the abstraction level at the adapters).

A further option for integrating software components is to deploy wrappers. A wrapper maps the API (Application Programmable Interface) of an external component (e.g. a MES application) onto the object model of the framework program. In this way a method of the framework program is obtained from a method of the API of the external component or an integer data type of the framework program is obtained from an integer data type of the API of the external component.

As well as MES applications, applications from corporate level (Enterprise Resource Planning level) and from automation level (controls level) can also be integrated via the framework program IF and monitored and managed via the workplace PIW1 (the acronym PIW stands for Personalized Industrial Workplace). The framework program IF thereby creates an integration platform for the entire industrial area. Different applications from corporate level, MES level and automation level can be integrated simply and economically by the framework program IF using adapters and/or wrappers. The framework program IF should therefore be seen as a middleware platform and a Manufacturing Application Integration tool. A user (e.g. the unit operator) can see the respective statuses of the applications to be monitored via the workplace PIW1 and can access data and application methods and can also connect applications by means of said access.

The framework program IF thereby on the one hand allows vertical integration of applications from different company levels to be achieved and on the other hand the framework program IF allows the horizontal integration of MES level applications. In the framework program IF the exchange of information between components is achieved via standard data formats (e.g. XML), standard protocols (XOP, OPC, etc.) and standard transport mechanisms (e.g. DCOM, HTTP or MSMQ).

The workplace PIW1 represents "one window to the world" for users at the front end of MES applications or other applications from the company. In other words the workplace allows integrative access to different, even heterogeneous applications within the company via a shared standard surface. The user of the workplace PIW1 can therefore monitor and manage all integrated MES or other applications from this one workplace. This workplace can be connected to the applications via the internet, the intranet, LAN (Local Area Network) or other possible connections. It is also possible to configure said workplace as a mobile station, e.g. as a mobile terminal (PDA, mobile phone). Such mobility can offer the user further advantages. The workplace PIW1 also comprises input means and one or a plurality of display devices AZ (e.g. display or monitor).

Figure 3:
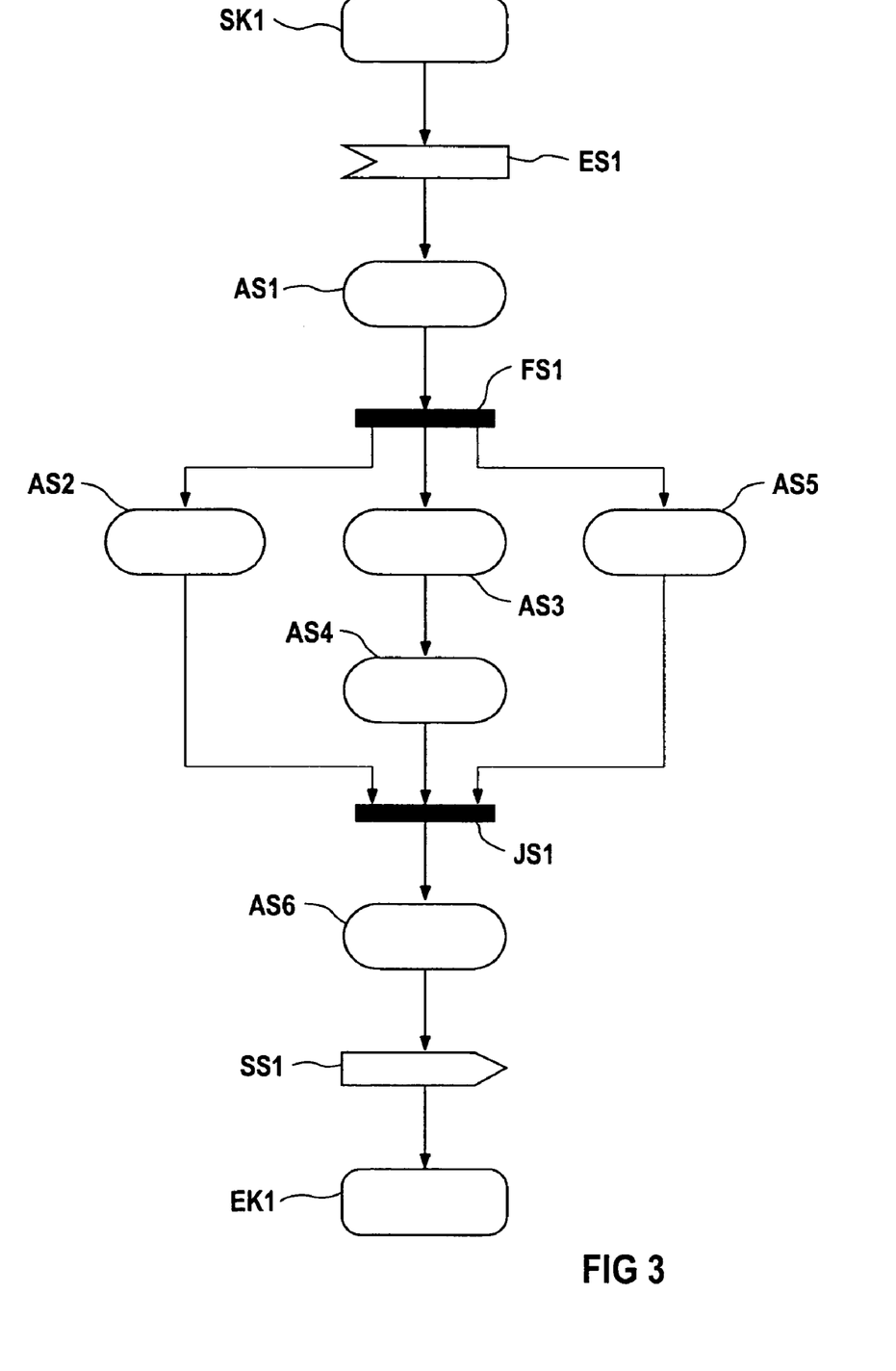
FIG. 3 shows an example of a state machine.
Figure 5:
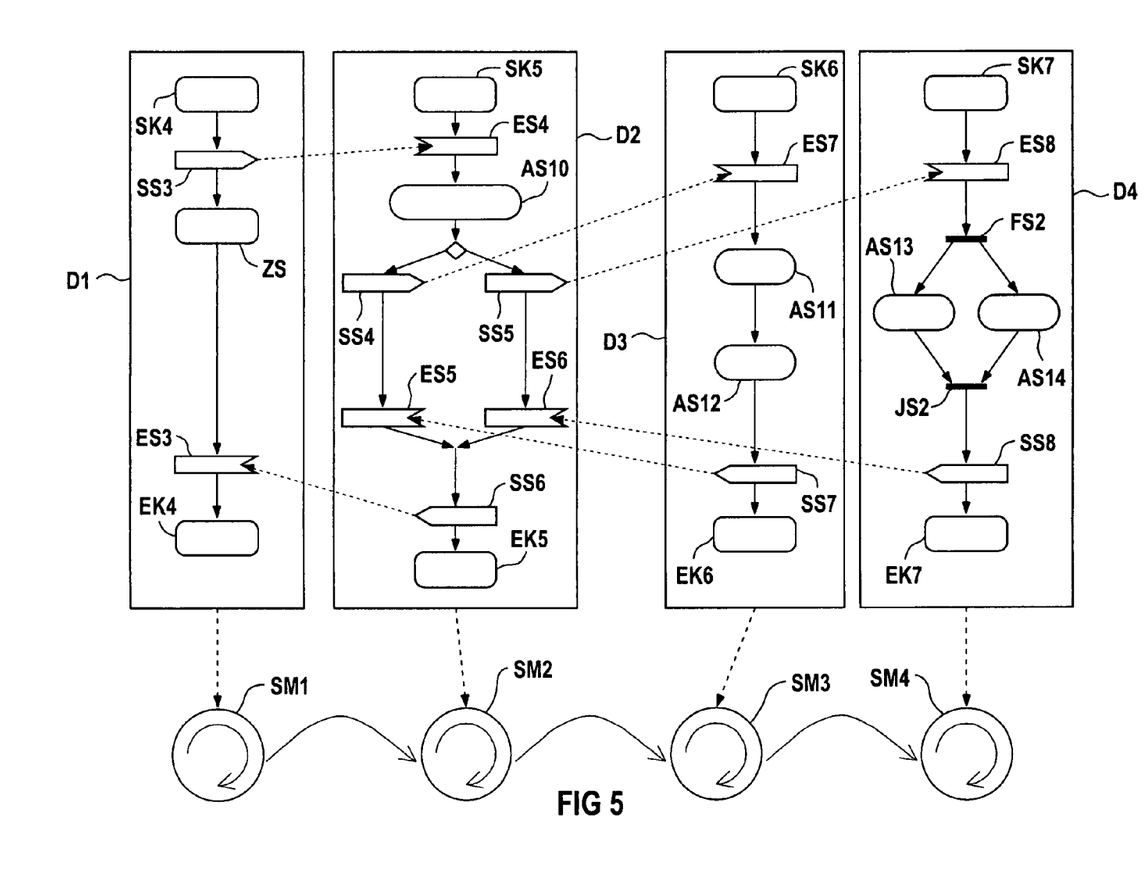
FIG. 5 shows the distribution of an MES application in independently operating sub-units and FIG. 6 shows a projection surface for activity diagrams.

The representation according to FIG. 3 shows an example of a state machine. State machines (SM1-SM4; FIG. 5) are modeled by what are known as activity diagrams (D1-D4; FIG. 5), which describe the response of a state machine. A sequential operation, which starts at a start node SK1 and ends at the end node EK1, is described in an activity diagram. The program run itself is described in the vertical from the top downwards using symbols, which are connected together by arrows. The program run itself follows from symbol to symbol along the arrows. In FIG. 3 the receive symbol ES1 follows the start node SK1. If there is a message present for a receive signal ES1, the program run continues, otherwise the program run waits until a message arrives for the receive symbol ES1. The next symbol after the receive symbol ES1 is the activity symbol AS1. If the program run encounters an activity symbol, activities are executed, which are stored behind the activity symbol (e.g. launch of a sub-program, method calls, etc.). Scripts, e.g. visual basic scripts, are executed in most cases. The next symbol in the program run in FIG. 3 is a fork symbol FS1, shown by a horizontal bar. Associated with every fork symbol is a joint symbol, also shown by a horizontal bar. FIG. 3 shows the joint symbol JS1. Parallel branches with parallel operations are spanned by a fork symbol and these then wait for each other in the associated joint symbol. In the representation according to FIG. 3 three parallel branches are spanned by the fork symbol FS1. The left branch only contains the activity symbol AS2, the right branch only contains the activity symbol AS5 and the center branch contains the two activity symbols AS3 and AS4. The activity symbols show that activities are executed. When the activities of all three branches are terminated, the program run continues with the symbol following the joint symbol JS1, in FIG. 3 the activity symbol AS6. After execution of the activity associated with the activity symbol AS6, the program run encounters the send symbol SS1. Messages are sent by send symbols. After sending the message, as shown by the send symbol SS1, the program run moves to the end node EK1 and terminates. Activity diagrams can however also be modeled as permanently operating processes.

Such activity diagrams are used to describe processes, which represent the response of sub-units for software solutions, particularly MES solutions. A solution for an MES system generally comprises very many such processes, which are then described for their own part individually as activity diagrams and which however communicate asynchronously with each other by means of the message exchange via send and receive symbols. This results in a loose coupling of such processes. This loose coupling means that the individual processes of an MES solution can be created separately and more or less independently of each other. Loose coupling also allows very simple recycling of processes, sub-processes or a collection of processes for specific sub-tasks in an MES system.

Figure 4:
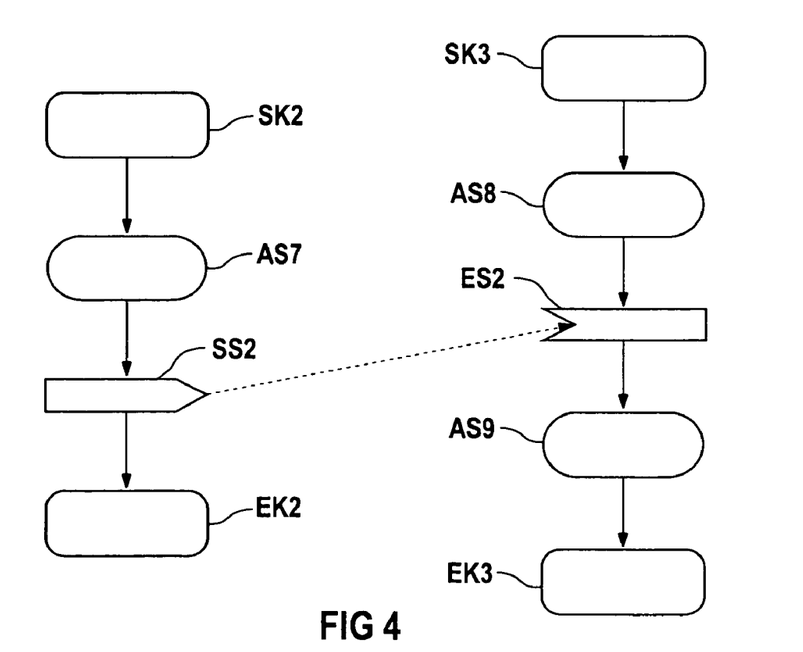
FIG. 4 shows an example of the cooperation of state machines.

The representation according to FIG. 4 shows an example of the cooperation of state machines (SM1-SM4; FIG. 5). FIG. 4 shows the operations of two state machines. The state machine in the left part of FIG. 4 is represented by the activity diagram (D1-D4; FIG. 5) with the start node SK2, the activity symbol AS7, the send symbol SS2 and the end node EK2. The state machine on the right side of FIG. 4 is represented by the activity diagram with the start node SK3, the activity symbol AS8, the receive symbol ES2, the activity symbol AS9 and the end node EK3. The dotted arrow from the send symbol SS2 of the left activity diagram to the receive symbol ES2 of the right activity diagram shows that the two state machines are loosely coupled to each other. In the right activity diagram the program run in the receive symbol ES2 can only continue, if a message has been sent from the left activity diagram by the send symbol SS2 to the receive symbol ES2. In the receive symbol ES2 the program run does not continue, until this message arrives.

The representation according to FIG. 5 shows the distribution of a MES system in four independently operating sub-units (e.g. simple or complex business processes), each of which corresponds to the state machines SM1 to SM4. The response of the state machines SM1-SM4 is described by the activity diagrams D1 to D4 respectively. In the representation according to FIG. 5 these state machines SM1 to SM4 are shown with a notation similar to that of a data flow diagram at the bottom of the diagram. Each of these state machines SM1 to SM4 corresponds to an MES application or MES component or MES subcomponent. The response of each of these subcomponents is described by activity diagrams D1-D4, which are shown above the data flow diagrams. In each of the rectangular boxes above the data flow diagram notation are the activity diagrams, which describe the program run assigned to a state machine SM1-SM4. This assignment of activity diagrams to the respective state machine is shown by broken arrows from the respective box to the respective bubble (circle, node), which corresponds to a state machine.

In the left activity diagram D1 the status symbol ZS is introduced as a new symbol. This can be used for example to define waiting statuses. In the next activity diagram D2, which is assigned to the state machine SM2, an inquiry symbol is introduced as a further new symbol. This inquiry symbol is represented by a small diamond and in the program run of the state machine SM2 it follows the activity symbol AS10. Either the left or right branch is taken as a function of the result of an inquiry. In the inventive system or method an inquiry is coupled to an interpreter, which has one rule installed per branch and the branch with the first applicable rule is taken. In the representation according to FIG. 5 the flow chart bubbles (circles, nodes), each of which corresponds to the state machines SM1 to SM4, are connected to each other by arrows. This shows that at the level of the data flow diagrams (shown in a data flow diagram type notation) communication links can be switched between the associated activity diagrams. Users can abstract from the implementation of said connections. Regardless of which communication means (e.g. MSMQ, HTTP or DCOM) are available, an associated link is implemented according to the connection.

If a user models activity diagrams D1-D4 and establishes asynchronous communication between the activity diagrams by means of connections, a corresponding runtime system is created parallel to this. The processes and connections can then be run and tested immediately in this runtime system. The diagrams can for example be tested in single-step mode or even by means of recursive single steps. There is therefore an integrated editing and runtime system. Users carrying out an engineering operation thereby create an associated runtime system at the same time.

If users for example project a connection between two state machines, a link is established implicitly for this purpose, e.g. a Microsoft message queue or an HTTP link. Associated implementation elements are also automatically generated e.g. as processes and/or storage areas in the operating system for the individual elements of the activity diagrams as they are modeled.

Figure 6:
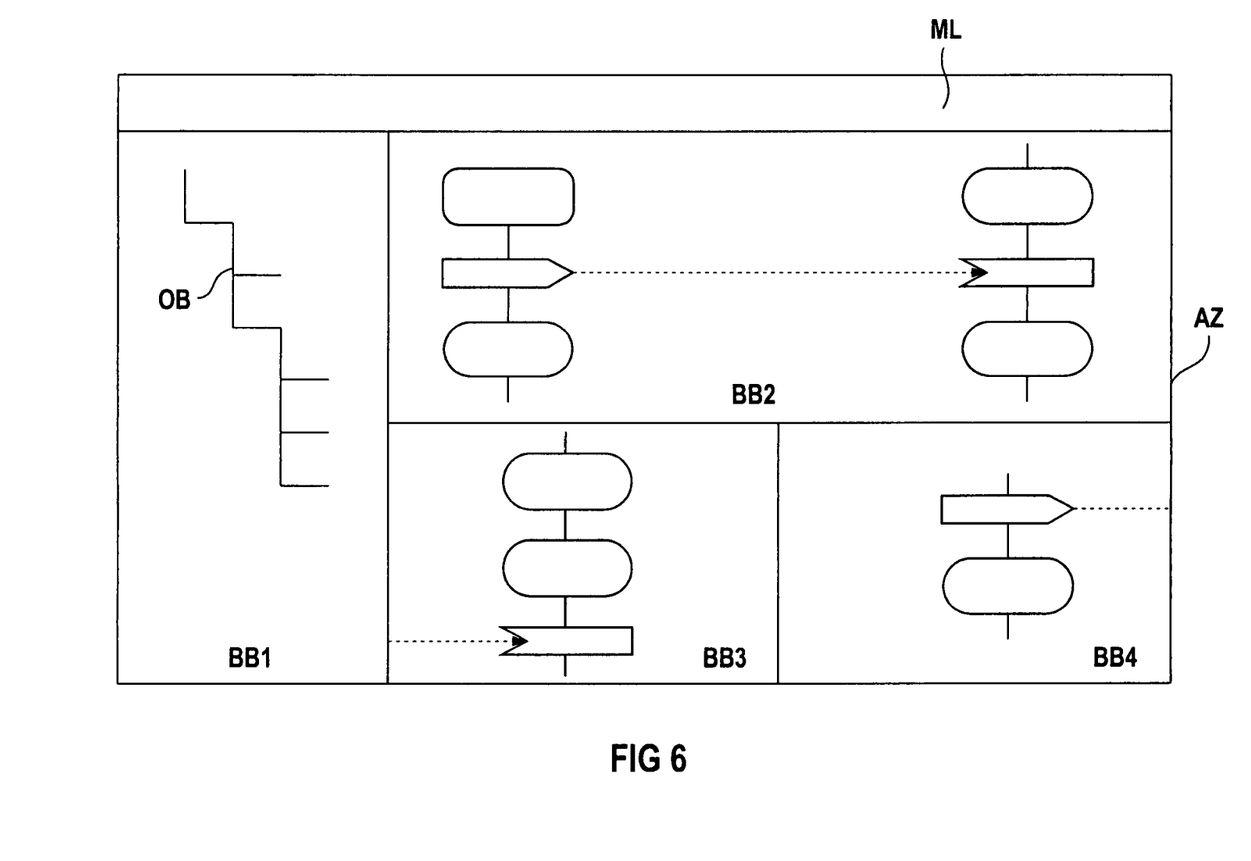

The representation according to FIG. 6 shows a projection surface for activity diagrams. Different screen areas BB1 to BB4 are shown on a display device AZ (e.g. monitor or display). A menu list ML is also shown at the top of the image, on which there are function buttons, which can be selected via input tools, such as a mouse or keyboard. The menu list ML can also contain the activity diagram symbols, which can then be dragged using a drag & drop mechanism to the corresponding screen areas. One or a plurality of activity diagrams can be shown in each of the screen areas BB2 to BB4. The screen area BB1 displays an object tree OB stylistically in explorer-type notation, representing the underlying software system (e.g. a framework program). Drag & drop mechanisms can be used to link elements of the object tree OB to activity diagrams. In other words objects or elements of the object tree OB are stored with activity diagrams, which represent an operation. Connections between activity diagrams can be effected via data flow diagrams, as shown in FIG. 5. A further connection option is achieved via what are known as projection masks, which are assigned to the send and receive symbols of the activity diagrams. Users can use these projection masks to select the associated receive or send symbols in the respective diagrams. The projection masks are also used to determine which messages are exchanged and of which type (e.g. integer, real or even types defined by users themselves) these messages are. Connections can also be effected at the object tree OB level. This is also via drag & drop mechanisms.

Users therefore have a powerful projection environment. When creating a projection, in other words when modeling activity programs, an associated runtime system is automatically created for this purpose, in which the activity diagrams operate. The activity diagrams can be created in a stand-alone and independent manner for their part. They then operate sequentially and synchronously but they communicate asynchronously. This loose coupling means that MES systems particularly can be modeled and implemented very easily.

In a subsequent deployment the activity diagrams or state machines (SM1-SM4; FIG. 5) are distributed on computers, in which they also physically operate. It is for example possible for a server to contain more than just one activity diagram. Appropriate deployment for example allows a balanced load distribution to be achieved.

Users are supported by the invention in a plurality of phases. First they are supported in the business process finding phase, i.e. when modeling their business processes. The automatic creation of an associated runtime system then helps users insert the business process they have found into an IT solution. This happens automatically and without design violation. In a third phase users can observe and control a defined business process. This system can therefore also be used for testing. Appropriate visualization, e.g. graphics and color use, allows the system to use animation as well.

The elements of the activity diagrams can be executed immediately, as they refer to executable codes (e.g. visual basic scripts or COM objects).

Users can implement debugging in single-step mode or in a full run (fast run through the single steps).

To summarize, the invention relates to a system and a method for testing and/or debugging runtime systems, particularly runtime systems for solving MES (Manufacturing Execution System) problems, whereby users use an editor to link graphic elements to an activity diagram that can be visually depicted on a display device, whereby communication relationships can be established between the activity diagrams by using appropriate means and whereby the operation of an asynchronously cooperating state machine is described by an activity diagram.

The inventive system or method described above can be implemented as a computer program in known languages for this. A computer program thus implemented can be stored and transported in a similarly known manner via electronic data paths as well as on data media (e.g. computer program products).

The invention claimed is:

1. A method for testing and/or debugging runtime systems for solving problems in a Manufacturing Execution System (MES), comprising:

providing a manufacturing execution system as a connecting element, vertically integrating an enterprise resource planning level and an automation level in an automated manufacturing process, the automation level providing process control in relation to a drive unit, an actuator and a sensor, wherein the manufacturing execution system includes a framework program to which a user workplace is connected via a bidirectional information path and to which a plurality of MES applications are connected via adapters to effect management and monitoring of the applications, and wherein the manufacturing execution system operates in a runtime system mode for temporal process control of the MES applications and in an engineering system mode for producing and editing programs that are executed in the runtime mode;

providing activity diagrams each graphically describing on a display device of the user workplace a process according to a software module of the manufacturing execution system, each activity diagram visually depicted on the display device illustrating operation of an associated asynchronously cooperating state machine;

enabling asynchronous communication between different ones of the software module processes that are graphically described on the display device;

establishing an asynchronous communication relationship between the different ones of the software module processes that are graphically described on the display device by linking, on the display device, graphic elements between activity diagrams of the different software module processes such that the linking of such graphic elements on the display device effects establishment of the asynchronously communications relationship, wherein exchange of information in accord with the asynchronously communication relationship facilitates solving a problem relating to a business or production process and wherein processes relating to the problem being solved are fractionized into disjoint, sequentially operating sub-processes with synchronization and data transmission messages between the sub-processes, wherein the sub-processes operate on business objects that are defined by asychronously cooperating state machines and are themselves objects;

performing in the engineering system mode a single test with one or more of the sub-processes during interaction by a step-by-step run through of the one or more sub-processes;

during the step-by-step run through of the one or more sub-processes, visually activating an element displayed in an activity diagram; and controlling progress to a next step in the run through by the user, wherein steps can be repeated or skipped.

2. A method according to claim 1, wherein the sub-processes comprise single steps, which refer to executable code.

3. A method according to claim 1, wherein control of the runtime system mode is effected in elements of the activity diagram.

4. A method according to claim 1, wherein a single step can be allocated methods and associated parameter assignments by means of variable values, conditions or references to other objects and wherein the variables values for the single steps are pre-allocated statically or dynamically.

5. A method according to claim 1, wherein complete or partial solutions are loaded and launched by linking, on the display device, graphic elements between different activity diagrams thereby effecting connections between different processes.

6. A method according to claim 1, wherein during operation in the engineering system mode a current graphic element in an activity diagram is identified optically on a display device.

7. A method according to claim 1, wherein, in the engineering system mode, error statuses are highlighted visually.

8. A method according to claim 1, wherein the method is implemented by a computer program.

9. A manufacturing execution system including capability for testing and/or debugging runtime systems in order to solve a problem in the manufacturing execution system, comprising:

a framework program vertically integrated with an enterprise resource planning level and an automation level for controlling an automated manufacturing process, the automation level providing process control in relation to a drive unit, an actuator and a sensor;

a user workplace connected to the framework program via a bidirectional information path;

a plurality of business and production process applications connected via adapters to the framework program to effect management and monitoring of the applications, and wherein the manufacturing execution system operates in a runtime system mode for temporal process control of the applications and in an engineering system mode for producing and editing programs that are executed in the runtime mode;

a mechanism for establishing a asynchronous communication relationship between different ones of the applications wherein one of the applications responds to the other as an asynchronously cooperating state machine;

a display device on the user workplace and a display mechanism for providing activity diagrams on the display device, each diagram graphically describing a process according to a software module of the manufacturing execution system, each activity diagram visually depicted on the display device illustrating operation of an associated asynchronously cooperating state machine;

an editor for linking graphic elements between activity diagrams and visually depicting the linking on the display device;

first input and/or display mechanisms for determining and describing relevant ones of the business and production processes applications to solve the problem in the manufacturing execution system;

second input and/or display mechanisms for defining and describing relevant business objects or components of the relevant business and production process applications by asynchronously cooperating state machines that are illustrated by each activity diagram on the display device;

third input or display mechanisms for breaking down the relevant business and production process applications into disjoint, sequentially operating sub-processes with synchronization and data transmission messages between the sub-processes, wherein the sub-processes operate on business objects that are defined by asychronously cooperating state machines and are themselves objects;

a test mechanism for a single test in the engineering system mode on the sub-processes during interaction by a step-by-step or complete run through of the sub-processes; and an input mechanism for controlling progress to the next step, wherein steps can be repeated or skipped, and wherein an element that is active in the activity diagram is identified on the display device.

10. A system according to claim 9, wherein the sub-processes comprise single steps, which refer to executable code.

11. A system according to claim 9, wherein control of the runtime system mode is effected in elements of the activity diagram.

12. A system according to claim 9, wherein the manufacturing execution system operates in a runtime s stem mode for tem oral process control and wherein the editor operates in an engineering system mode for producing and editing programs that can be executed in a runtime mode and wherein a single step can be allocated methods and associated parameter assignments by means of van able values, conditions or references to other objects and wherein the variables for the single steps are pre-allocated statically or dynamically.

13. A system according to claim 9, wherein complete or partial solutions are loaded and launched with their connections.

14. A system according to claim 9, wherein during operation of the asynchronously cooperating state machine the current graphic element in the activity diagram in each instance is identified optically on a display device.

15. A system according to claim 9, wherein error statuses are highlighted visually.

* * * * *